Aug. 6, 1968    E. S. KNUDSEN    3,396,280
METHOD FOR DETERMINING THE FAT CONTENT OF
TRIMMINGS OR SIMILAR PIECED MEATS
Filed Aug. 24, 1965
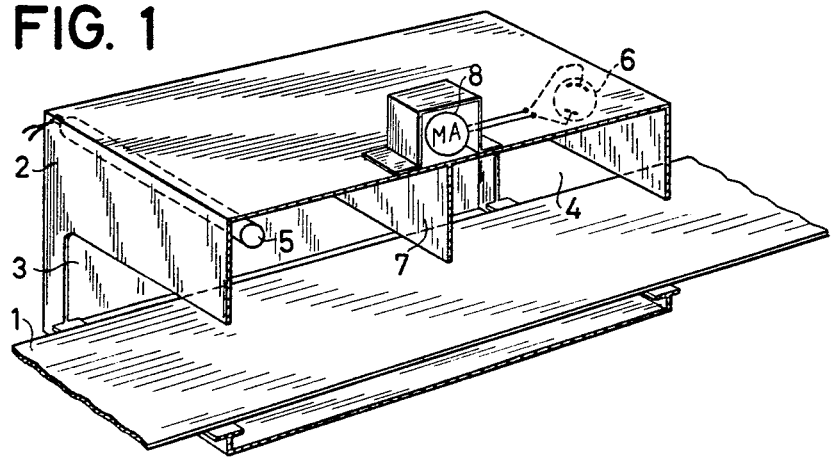
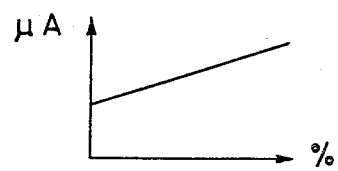
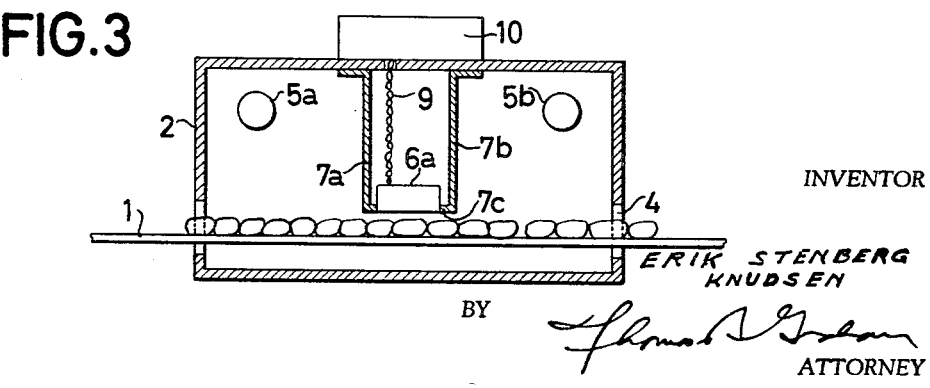
INVENTOR
ERIK STENBERG KNUDSEN
BY
ATTORNEY 3,396,280
METHOD FOR DETERMINING THE FAT CONTENT
OF TRIMMINGS OR SIMILAR PIECED MEATS
Erik Stenberg Knudsen, Roskilde, Denmark, assignor to Slagteriernes Forskningsinstitut, Roskilde, Denmark, a company of Denmark
Filed Aug. 24, 1965, Ser. No. 482,163
Claims priority, application Denmark, Aug. 28, 1964, 4,256/64
1 Claim. (Cl. 250—223)

The invention relates to a method for determining the proportion between meat and fat in a batch with pieces of meat prepared for the production of meat goods, by which method the pieces of meat are in lump size as so-called trimmings. Pieces of meat of this kind are used as starting material in the production of for instance tinned meats and sausage products. The size of the meat lumps involves that in the individual piece there may be rather marked variations in the proportion between meat and fat. As a consequence of this circumstance, it has up to now been considered necessary to use skilled labour for the evaluation of the composition. Even in such cases, inaccuracies are frequently experienced on account of the subjective evaluation.

It is an object of the present invention to provide a method by which, irrespective of the substantial dissimilarity in the composition of the comparatively big pieces of meat, a signal can be provided which is a measure for the proportion between meat and fat in the material intended to enter into the production, so that, in an uncomplicated manner, an objective measure can be obtained for the fat content in a given batch of trimmings, and so that, on this basis, adjustment of the composition of the ultimate product can be made.

The method according to the invention is characteristic in that the pieces of meat are distributed in a layer over a conveyor advancing them to a zone within which they are irradiated with light, that the instantaneous intensity of light reflected from the irradiated zone is measured by means of photoelectric means, and that from the instantaneous values measured during the passage of the total batch through the said zone a mean value is established as a measure for the fat content in the total batch. It has been proved surprisingly that the established result is a measure for the proportion between meat and fat in the total batch with only an insignificant percentage of inaccuracy, irrespective of the relatively big dimensions of the pieces of meat.

It should be remarked that within other technical fields the utilization of the reflection of visible light for the procurement of measuring results is well known. However, it has here always been the question about measurements carried out on particularly finely divided materials being for instance of an order of size permitting suspension in water with a view to examining their concentration. It is surprising that by the method according to the invention, where comparatively big pieces of meat are involved, it is possible, merely by measuring the trimmings on basis of the reflection from the surface, to obtain measuring results showing a so great accuracy that based on these results it is possible to determine the proportion between the amounts of different solid materials in a total batch of trimmings. The conveyor can be caused to give off a quantity, the size of which is determined by the desired mean value, so that, as final result, a batch of trimmings with a given proportion between fat and meat is obtained. If the desired proportion cannot be obtained in proximity to the size of batch desired for continued processing, the correct composition may quickly be obtained by adding a suitable amount of meat or fat.

The invention is explained more in detail below with reference to the schematic drawing, wherein:

FIG. 1 shows a section through an apparatus for carrying out the method according to the invention, FIG. 2 shows a curve of the dependence between the fat content and a current produced in the apparatus shown in FIG. 1, and FIG. 3 shows in section another embodiment of the apparatus for carrying out the method according to the invention.

FIG. 1 shows an apparatus for determination of the fat content of meat being advanced in the form of trimmings by a conveyor band 1, on which the meat is distributed arbitrarily, the trimmings being arranged in such a manner as to cover the band in a fairly uniform layer. The apparatus contains a box 2, the inner surface of which is covered by a poorly reflecting coat or for instance black paint. The box has openings 3 and 4, through which the meat can be conveyed by means of the conveyor band 1.

Inside the box, a source of light is arranged at one end in the form of a fluorescent tube 5 irradiating the conveyor band with the trimmings on same over the whole width of the band. At the other end of the box are a number of light-sensitive cells 6, being so arranged that they can intercept light being reflected from the trimmings in the entire width of the conveyor band. Between the fluorescent tube 5 and the light-sensitive cells 6 a shade 7 is arranged to prevent direct irradiation of the light-sensitive cells.

The light-sensitive cells, preferably barrier layer cells which, on exposure to light, generate an electric current, are connected by leads with an indicating instrument 8, for instance a galvanometer, by means of which the current supplied by the cells can be measured.

When the light from the light source 5 hits the trimmings on the conveyor band, part of the light is reflected against the photoelectric cells, which send a current through the galvanometer. The size of this current depend on the reflection from the pieces of meat exposed to radiation and, consequently, on the ratio between fat and lean meat in the irradiated surface.

FIG. 2 shows a curve of the dependence between the current proceeding in the indicator and the fat content of the trimmings on the conveyor band, and it will be seen from the curve that there is an unambiguous correlation between the fat content and the current measured.

The current recorded by the instrument consequently expresses the content of fat in the trimmings, and can be utilized for continuous control of the fat content of the trim of meat advanced by the conveyor band, or integration may be made, or a summing-up of several individual readings for determination of the total fat content in a bigger batch of pieced meat.

In FIG. 3 the conveyor belt is denoted by reference numeral 1, the wall of the enclosure by 2 and the apertures by 3 and 4 as in FIG. 1. A partition dividing the enclosure in two parts comprises three walls 7a, 7b, and 7c screening a row of downward facing photoelectric cells 6a from direct light from two linear light tubes 5a and 5b. The row of photoelectric cells extends over the whole width of the conveyor belt 1 and are by leads 9 electrically connected to a registering apparatus or a computer 10 from which the mean value of the momentary values picked up by the photocells can be derived. This mean value is a measure of the fat content in the whole batch passed through the apparatus.

It is obvious that the invention is not confined to the embodiment shown, but that there are a great many possibilities within the scope of the invention. Thus, it is possible to use ultraviolet light instead of visible light, and other means than barrier layer cells can be used for the measuring of the light reflected by the pieces of meat. The box may have shapes different from the one shown, and the arrangement of the source of light and the light-sensitive cells can be varied in many ways.

What is claimed is:
1. In a method of determining the ratio between fat and lean in a batch of meat lumps prepared for the production of meat products the steps of distributing said lumps in a layer on a conveyor feeding said layer into a zone in which it is irradiated with light, measuring by photoelectric means the light reflected from said layer in said zone and deriving from the measured instantaneous values a mean value as a measure of the ratio of lean and fat in said portion.

References Cited

UNITED STATES PATENTS

| | | | |
|---|---|---|---|
| 1,294,740 | 2/1919 | Winkley | 250—223 X |
| 2,565,727 | 8/1951 | Henderson | 250—223 X |
| 2,602,185 | 7/1952 | Johnson | 250—223 X |
| 3,224,320 | 12/1965 | Knudsen | 88—14 |
| 3,282,115 | 11/1966 | Taylor et al. | 73—432 |

RALPH G. NILSON, *Primary Examiner.*

M. A. LEAVITT, *Assistant Examiner.*